A. F. GEORGE.
WINDMILL.
APPLICATION FILED JUNE 14, 1915.
1,228,660.
Patented June 5, 1917.
3 SHEETS—SHEET 1.
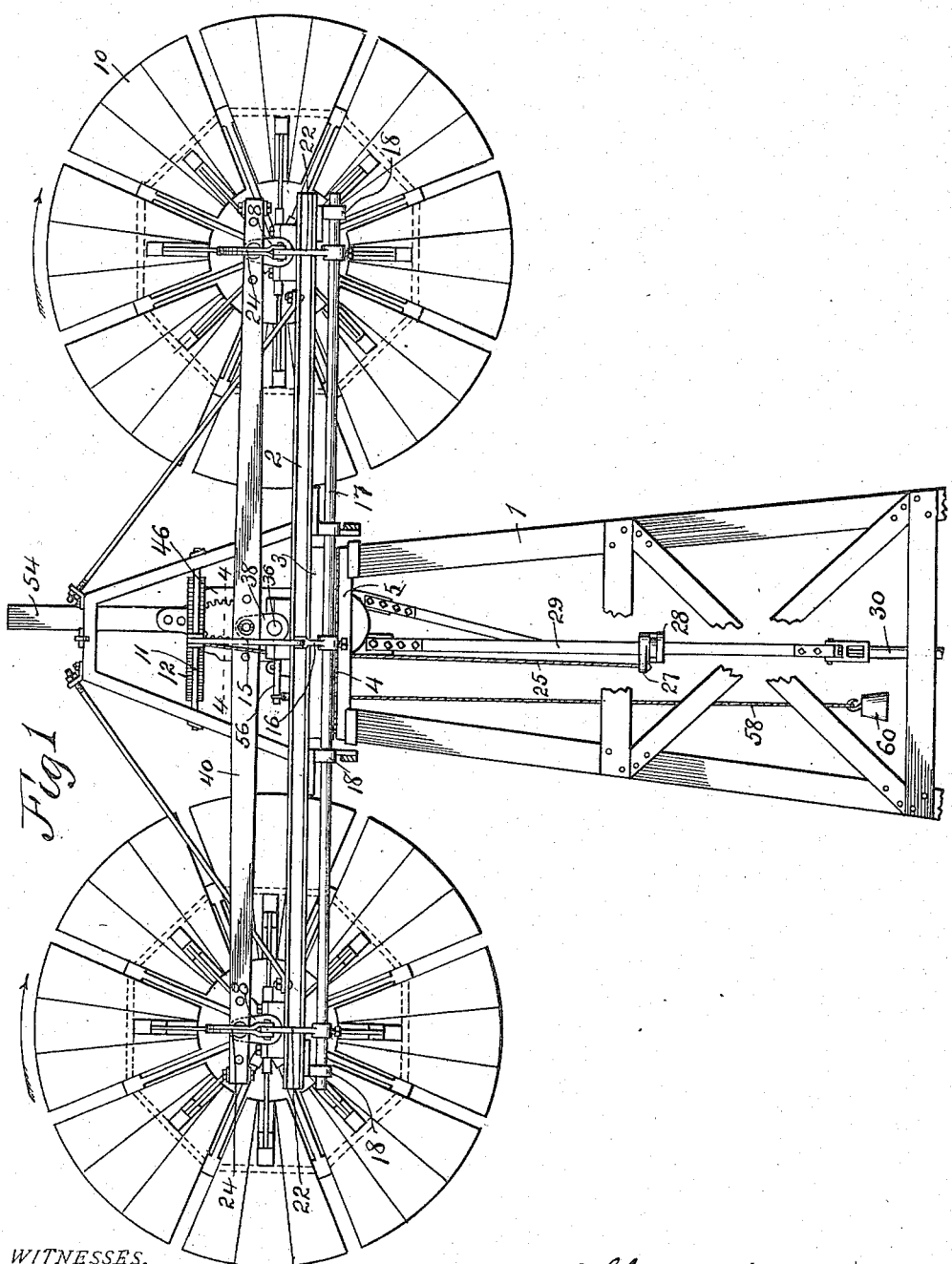
WITNESSES.
R E Hamilton
E B Thaus
INVENTOR.
Albert F. George
BY Warren D. House
His ATTORNEY.

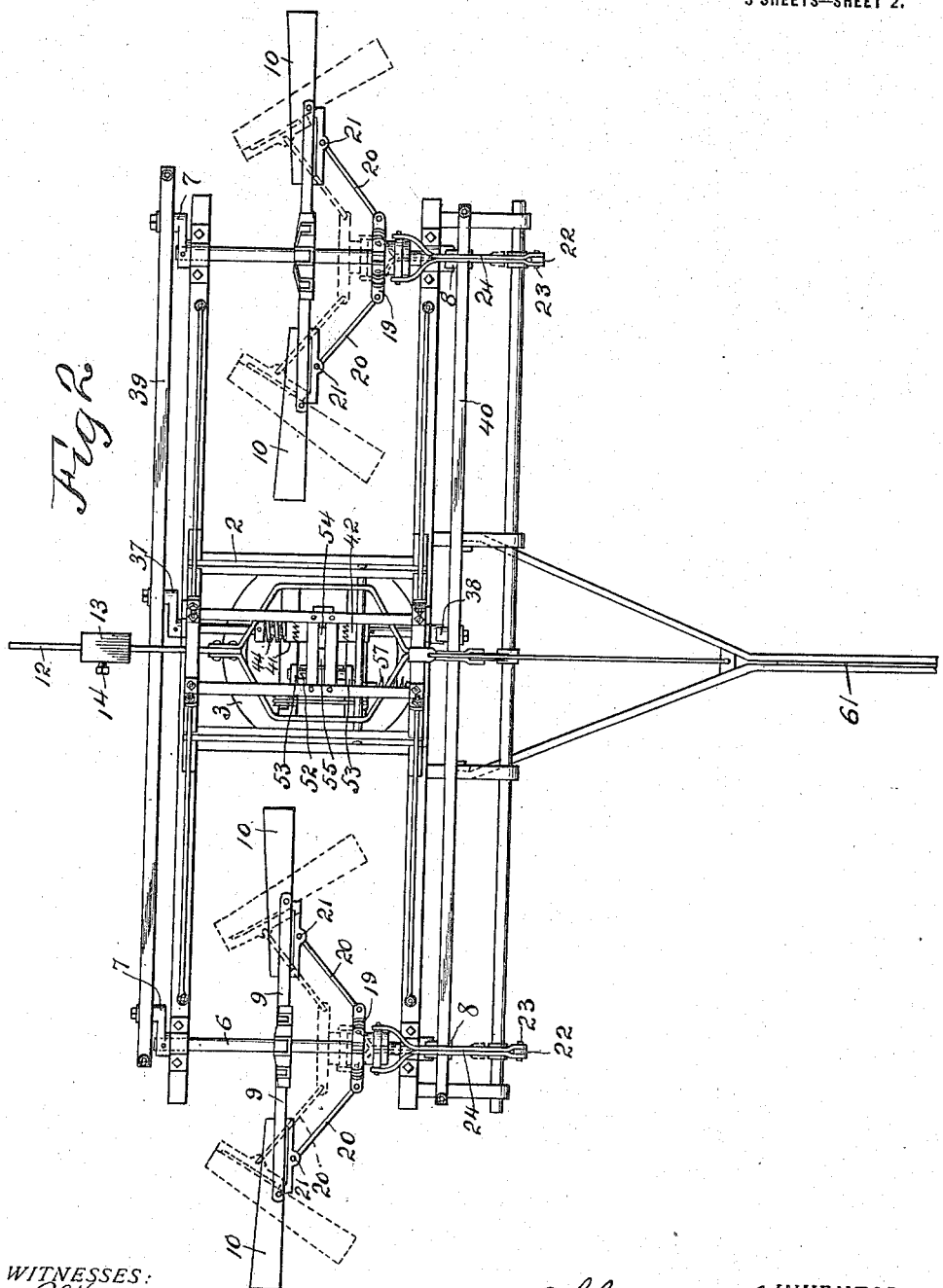

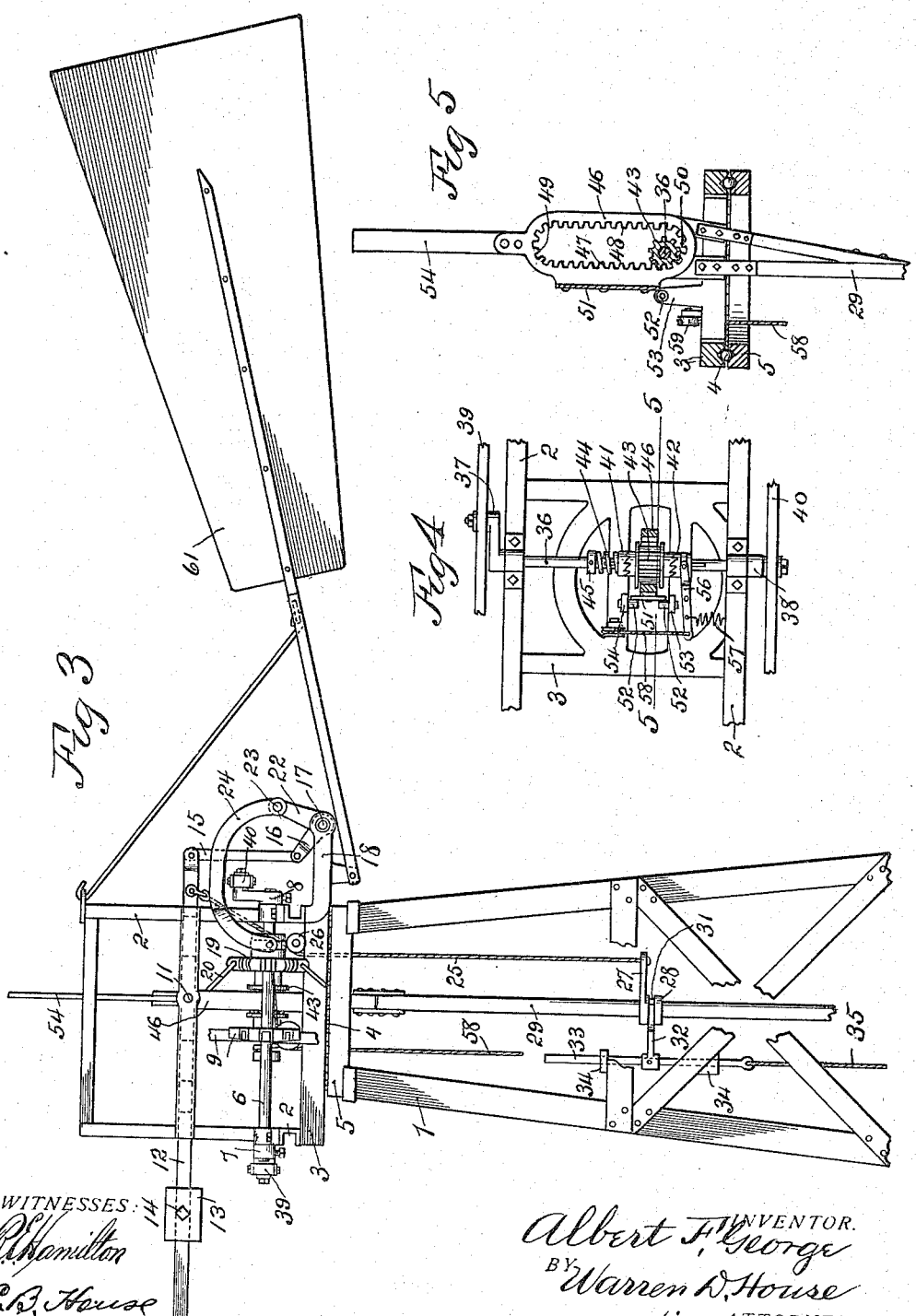

UNITED STATES PATENT OFFICE.

ALBERT F. GEORGE, OF SALINA, KANSAS.

WINDMILL.

1,228,660. Specification of Letters Patent. Patented June 5, 1917.

Application filed June 14, 1915. Serial No. 33,907.

*To all whom it may concern:*

Be it known that I, ALBERT F. GEORGE, a citizen of the United States, residing at Salina, in the county of Saline and State of Kansas, have invented a certain new and useful Improvement in Windmills, of which the following is a specification.

My invention relates to improvements in windmills.

It relates particularly to the type of windmill in which a plurality of wind wheels are mounted on a single tower. It also relates to the type of wind mills in which the wind wheels are always held in the into-the-wind position, the blades of the wind wheels being movable by wind pressure from the into-the-wind position when the pressure becomes excessive.

One of the objects of my invention is to provide novel transmitting power connecting the wind wheel or wheels with the driven mechanism, by means of which the load may be increased under heavy wind pressure without permitting the wind wheels to race or turn too rapidly.

A further object of my invention is to provide power transmitting mechanism of novel construction which permits of a more rapid down stroke of the pump rod than is usually obtained.

Still another novel feature of my invention resides in the gearing which lifts the pump rod by means of which an effective pump rod lifting mechanism is obtained.

The novel features of my invention are hereinafter fully described and claimed.

In the accompanying drawings which illustrate the preferred embodiment of my invention, Figure 1 is a rear elevation of a double wheel wind mill provided with my improvements, some of the parts being removed and some broken away.

Fig. 2 is a plan view of the same, some of the parts being removed and some broken away.

Fig. 3 is a side elevation of the same, some of the parts being removed and some broken away.

Fig. 4 is a fragmental horizontal sectional view on the line 4—4 of Fig. 1.

Fig. 5 is a vertical sectional view on the line 5—5 of Fig. 4.

Similar reference characters designate similar parts in the different views.

1 designates an ordinary windmill tower on which is horizontally revoluble a suitably constructed frame 2 which is mounted upon a base 3 which is supported by balls 4 mounted in a ball race provided in the upper side of a top plate 5 which is secured to the top of the tower 1.

Rotatably mounted on the frame 2 are two wind wheels, each having a horizontal shaft 6 rotatable on the frame 2 and provided with front and rear cranks 7 and 8, set quartering to each other.

Secured to each shaft 6 are radial arms 9, to which are respectively pivoted blades 10, each of which has at one side of its pivotal point an area adapted to be exposed to the wind greater than the area at the opposite side of the pivotal point. An excess wind pressure will thus cause the blade 10 to be swung from the into-the-wind position, shown in solid lines in Fig. 2, to the position, for instance, shown in dotted lines in said figure.

For automatically swinging the blades 10 of each wind wheel toward the into-the-wind position, the following described mechanism is provided.

Pivoted on a horizontal bar 11, mounted in the frame 2, is a substantially horizontal lever 12, which at one side of the bolt 11 has mounted on it a longitudinally slidable weight 13, which is adapted to be secured in position by a set screw 14.

At the other side of the pivot bolt 11, the lever 12 has pivoted to it the upper end of a link 15, the lower end of which is pivoted to a crank arm 16 which is provided at the center of a longitudinal rock shaft 17, which is pivotally mounted in brackets 18 secured to the frame 2.

Two sleeves 19 are respectively slidably mounted on the wind wheel shafts 6. Each sleeve has pivoted to it one set of ends of a plurality of radial rods 20, the opposite set of ends of which are pivoted at the points 21 to the blades 10 respectively. As will be seen in Fig. 2, the pivot points 21 are each located at the inner side of a straight line connecting the pivot points of the adjacent blade 10 with the arm 9 and the pivotal point of the inner end of the adjacent rod 20. This construction permits the forward sliding movement of the sleeve 19 to readily swing the blades 10 out of the into-the-wind position.

The rock shaft 17 is provided also with two crank arms 22, the upper ends of which are respectively pivoted by bolts 23 with the rear ends of two arch-shaped links 24, Fig. 3, the forward ends of which are respectively pivotally and rotatably connected in any suitable manner with the sleeves 19. Preferably the pivotal points of the rear ends of the links 24 are disposed respectively substantially in longitudinal alinement with the axes of the wind wheel shafts 6. By means of this construction, the crank arms 22 being disposed nearly vertical and having but a limited swinging movement at opposite sides of the vertical plane of the rock shaft 17, the thrust of the links 24 is substantially along the axes of the shafts 6, thus eliminating a great deal of friction when the links 24 are employed to pull the sleeves 19 rearwardly in throwing the blades 10 toward the into-the-wind position.

The weight 13 in swinging downwardly the forward end of the lever 12, through the intermediacy of the link 15 and crank arm 16, rocks the rock shaft 17 clockwise, as viewed in Fig. 3, thereby sliding the sleeves 19 rearwardly on the shafts 6, through the intermediacy of the links 24, thus swinging the blades 10, by means of the rods 20 to the into-the-wind position, shown in solid lines in Fig. 2.

For swinging the blades 10 out of the wind or to a position shown in dotted lines in Fig. 2, the lever 12 adjacent to its rear end has secured to it the upper end of a rope 25, which passes over a roller 26 on the base plate 3, Fig. 3, and has its lower end secured to a horizontally extending arm 27 of a sleeve 28 which is vertically slidably mounted on a vertical member 29, the lower end of which is swiveled to the upper end of a vertical pump rod 30, as shown in Fig. 1.

The sleeve 28 is provided with an annular peripheral groove 31 in which is mounted the bifurcated end of a horizontal member 32, which is secured rigidly to a vertical rod 33, which is slidably mounted in bearings 34 secured to the tower 1, and which has its lower end fastened to the upper end of a depending rope 35.

An operator standing on the ground by pulling downwardly on the rope 35 will swing the rear end of the lever 12 downwardly, thus rocking the rock shaft 17 counter-clockwise, as viewed in Fig. 3, thereby throwing the blades 10 to the out-of-the-wind position, by means of the mechanism already described.

For vertically reciprocating the member 29 and the pump rod 30, the following mechanism is provided. A horizontal shaft 36 rotatably mounted on the frame 2 near the middle thereof and parallel with the wind wheel shafts 6 is provided at its forward and rear ends respectively with crank arms 37 and 38, Figs. 1, 2 and 4. Pivoted to the cranks 7 and 37 is a longitudinal horizontal transmission bar 39. A similar transmission bar 40 is pivoted to the crank arms 8 and 38. These bars may be ordinary wooden bars easily obtainable by any farmer.

Splined to the shaft 36 and longitudinally slidable thereon are two clutch members 41 and 42 which are adapted to respectively engage teeth in the opposite ends of a pinion 43, Figs. 4 and 5, which is rotatably mounted on the shaft 36.

A coil spring 44 encircles the shaft 36 and has one end bearing against a collar 45 secured to said shaft, and has its other end bearing against the clutch member 41 so as to normally hold said clutch member engaged with the pinion 43. The arrangement of the teeth in the clutch member 41 and the adjacent end of the pinion 43 is such that the clutch member will drive the pinion at the same speed as the shaft 36, and in the same direction, and will permit the pinion at times, as hereinafter described, to be rotated faster than the shaft 36.

The pinion 43 engages with an internal gear 46, Fig. 5, which is rigidly secured to the upper end of the reciprocating member 29.

The gear 46 is provided with two longitudinal parallel rows of teeth 47 and 48. Intermediate of the ends of said longitudinal teeth are two arcuate sets of teeth 49 and 50.

When the shaft 36 and the pinion 43 are rotated clockwise, as viewed in Fig. 5, the pinion will engage the row of teeth 47 and will thereby lift the member 29, the pump rod 30 and the gear 46, thus lifting the load of water which is carried by the pump rod 30 and member 29. The row of teeth 47 are preferably disposed, when in mesh with the pinion 43, in vertical longitudinal alinement with the member 29 and the pump rod 30, as shown in Figs. 1 and 5. By means of this arrangement, on the up stroke or working stroke of the pump rod, the load is in direct alinement with the row of teeth 47, thus effecting a straight pull, and eliminating torsional strain and liability of breakage of the gear or bar 29.

When the pinion 43 has reached the lower end of the vertical row of teeth 47, it will engage the teeth 50 at the lower end of the gear, thereby shifting the gear 46 and member 29 to the left, as viewed in Fig. 5, and causing the pinion 43 to engage with the vertical row of teeth 48. The clutch member 42 has teeth so arranged that it will, when engaged with the pinion 43, hold said pinion from rotating faster than the shaft 36, when the pinion is engaged with the vertical row of teeth 48 and the weight of the parts supported by the gear 46 is sustained by the pinion.

Upon the completion of the down stroke of the pump rod and gear 46, the teeth 49 being engaged with the pinion 43, the rotation of the latter will shift the gear 46 and member 29 to the right, as viewed in Fig. 5, thus causing the pinion to reëngage the teeth 47 and thereby again lift the pump rod 30 as before described.

For retaining the pinion 43 constantly engaged with the gear 46, any suitable mechanism may be provided. In the drawing, I have shown for this purpose, a vertical plate 51 secured to one edge of the gear 46, Fig. 5, and adapted to have one side bear against two rollers 52, which are respectively mounted upon two upwardly extending projections 53 on the upper side of the base 3, when the gear 46 moves downwardly. When said gear has completed its downward stroke, the pinion 43 will shift the gear laterally, so that the opposite side of the plate 51 will engage the rollers 52.

In order that the gear 46 shall turn with the frame 2, as said frame is swung by the wind, the gear 46 has secured to its upper end a flat vertical bar 54 which is slidably mounted and laterally oscillatable in a slot 55 provided in the upper end of the frame 2, as shown in Fig. 2.

In order that the clutch member 42 may be released from or retained engaged with the pinion 43, said clutch member has pivotally and rotatably connected with it a lever 56, Fig. 4, which is pivoted to the base plate 3. A coil spring 57 attached to the frame 2 and to the lever 56 normally holds said lever in a position in which the clutch member 42 will engage the pinion 43.

For withdrawing the clutch member 42 from engagement with the pinion 43, the lever 56 has secured to it a rope 58 which passes over a pulley 59 mounted on the base 3. By pulling downwardly on the rope 58, the clutch member 42 will be disengaged from the pinion 43. When this is done and the pinion engages the gear teeth 48 on the down stroke, the weight carried by the gear 46 will cause the gear, member 29 and the pump rod 30 to drop rapidly by gravity, thereby rotating the pinion 43 faster than the shaft 36. This increases the rapidity of the reciprocation of the pump rod, thus throwing an additional load upon the wind wheels.

In case of excess wind pressure, the weight 13 may be adjusted forwardly on the lever 12, so as to force the blades 10 more into the into-the-wind position, and at the same time, a weight 60, Fig. 1, may be hung onto the lower end of the rope 58, so as to swing the lever 56 and disconnect the clutch member 42 from the pinion 43. The pump rod 30 will now fall by gravity at the end of the upstroke and the pinion 43 will rotate faster than the shaft 36 and also faster than the wind wheels, so that the pump rod will be reciprocated more rapidly thus increasing the load thrown upon the wind wheels and thereby preventing them from revolving too rapidly. The power of strong winds may be thus utilized to increase the capacity of the wind mill without liability of its being damaged.

When the wind moderates, the weight 60 may be removed from the rope 58, and the weight 13 readjusted rearwardly on the lever 12 to correspond with the velocity of the wind. The clutch member 42 will now be locked with the pinion 43, thereby holding the pinion from running faster than the shaft 36, and thereby holding the pump rod from falling by gravity.

Secured rigidly to the frame 2 is a rearwardly extending vane 61 which always keeps the wind wheels in the into-the-wind position.

I do not limit my invention to the structure shown and described, as modifications, within the scope of the appended claims, may be made without departing from the spirit of my invention.

What I claim is:—

1. In a wind mill, a rotary shaft, a pinion rotatable on said shaft, a reciprocative longitudinally and laterally movable member adapted to lift a load and having a gear having two longitudinal parallel rows of teeth, the pinion being in mesh with said gear and adapted to lift said member and the load when engaged with one of said rows of teeth, means connecting said shaft and pinion for rotating said pinion when the latter is engaged with said row, and releasable means for connecting said shaft and pinion and adapted to hold the pinion from rotating faster than said shaft, the first named connecting means being arranged to permit such faster rotation of the pinion.

2. In a wind mill, a rotary shaft, a pinion rotatable thereon, two clutch members rotatable with said shaft and provided with means for engaging said pinion, one of said clutch members serving to drive said pinion and which permits the pinion to rotate faster than said shaft, the other clutch member being releasable from said pinion and which, when engaged therewith, holds the pinion from rotating faster than said shaft, a reciprocative member adapted to lift a load and movable longitudinally and laterally and provided with a gear engaging said pinion and having two longitudinal parallel rows of teeth, and means for retaining said pinion engaged with said gear.

3. In a wind mill, a rotary shaft, a pinion rotatable thereon, two clutch members rotatable with said shaft and adapted to engage said pinion, one of said clutch members serving to drive said pinion and to permit the pinion to rotate faster than said shaft, the other clutch member serving to hold the pinion from rotating faster than said shaft, means for normally holding the last named clutch member releasably engaged with said pinion, and a reciprocative member adapted to lift a load and movable longitudinally and laterally and having a gear engaging said pinion and provided with two longitudinal parallel rows of teeth.

4. In a wind mill, a wind wheel, a rotary shaft, driving means connecting said wheel and said shaft, a pinion rotatable on said shaft, two clutch members rotatable with said shaft each having means for engaging said pinion, one of said members serving to drive said pinion and to permit it to rotate faster than said shaft, the other member serving to hold the pinion from rotating faster than said shaft, releasable means for holding the last named clutch member engaged with said pinion, and a longitudinally reciprocative and laterally movable member adapted to lift a load and provided with a gear engaging said pinion and having two longitudinal parallel rows of teeth.

5. In a wind mill, a rotary shaft, a pinion rotatable thereon, two clutch members adapted to engage said pinion, one of said members serving to drive said pinion and to permit it to rotate faster than said shaft, the other member serving to hold the pinion from rotating faster than said shaft, means for moving the last named clutch member into and out of engagement with said pinion, and a longitudinally reciprocative laterally movable member adapted to lift a load and having a gear engaging said pinion and having two parallel rows of teeth, one of said rows when engaged by said pinion alining with the load.

6. In a wind mill, a rotary shaft, a pinion rotatable thereon, two clutch members adapted to engage said pinion, one serving to drive said pinion and to permit it to rotate faster than said shaft, the other serving to hold it from rotating faster than said shaft, the latter clutch member being releasable from said pinion, a longitudinally reciprocative laterally movable member adapted to lift a load and having two parallel rows of teeth disposed longitudinally and alternately engaging said pinion, and means for laterally shifting said reciprocative member at the end of each stroke.

7. In a wind mill, a rotary shaft, a pinion rotatable thereon, two clutch members adapted to engage said pinion, one serving to drive the pinion and to permit it to rotate faster than said shaft, the other serving to hold the pinion from rotating faster than said shaft, the latter clutch member being releasable from said pinion, a longitudinally reciprocative laterally movable member adapted to lift the load and provided with two longitudinal parallel rows of teeth adapted to alternately engage said pinion, one of said rows, when engaged by said pinion, being in alinement with the load, and means for laterally shifting said reciprocative member at the end of each stroke.

8. In a wind mill, a plurality of wind wheels, each having blades movable by excess wind pressure from the into-the-wind position, a rock shaft having a crank arm, a lever, a link connecting said lever with said crank arm, yielding means for swinging said lever, and means actuated by said rock shaft for simultaneously swinging the blades of said wind wheels.

9. In a wind mill, a rotary support, a plurality of wind wheels rotatably mounted on said support and provided each with blades movable by excess wind pressure from the into-the-wind position, a lever pivoted to said support, yielding means for swinging said lever, a rock shaft mounted in said support and provided with a crank arm, a link connecting said lever and said crank arm, and means actuated by said rock shaft for swinging the blades of said wheels.

10. In a wind mill, a wind wheel having a rotary shaft and provided with blades movable by excess wind pressure from the into-the-wind position, a member longitudinally slidable on said shaft and rotatable therewith, arms respectively connected to said blades and connected to said slidable member, a rock shaft having a crank arm, a link engaging and adapted to slide said slidable member and pivoted to said crank arm at a point substantially in longitudinal alinement with the axis of said shaft, a lever, means actuated by said lever for rocking said rock shaft, and yielding means for swinging said lever.

11. In a wind mill, a wind wheel having a rotary shaft and provided with pivoted blades, a member longitudinally slidable on said shaft, rods respectively connected to said blades and connected to said slidable member, a rock shaft having two arms, a link engaging and adapted to slide said slidable member and pivoted to one of said arms at a point in substantial alinement with the axis of the wind wheel shaft, a lever, a link connecting said other arm with said lever, and yielding means for swinging said lever.

12. In a wind mill, a plurality of wind wheels each having blades movable by excess wind pressure from the into-the-wind position, a rock shaft, means actuated by said rock shaft for simultaneously swinging said blades toward the into-the-wind position, a lever, yielding means for swinging said lever, and means actuated by said lever for rocking said rock shaft.

13. In a wind mill, a plurality of wind wheels, each having blades movable by excess wind pressure from the into-the-wind position, a rock shaft provided with a plurality of crank arms, means actuated by said crank arms for simultaneously swinging said blades toward the into-the-wind position, a lever, yielding means for swinging said lever, and means actuated by said lever for rocking said rock shaft.

14. In a wind mill, a plurality of wind wheels, each having blades movable by excess wind pressure from the into-the-wind position, a rock shaft having a crank arm, means actuated by said rock shaft for simultaneously swinging said blades toward the into-the-wind position, a lever, yielding means for swinging said lever, and a link connecting said lever with said crank arm.

15. In a wind mill, a wind wheel having blades movable by excess wind pressure from the into-the-wind position, a vertically movable load lifting member having two longitudinal parallel rows of rack teeth, a rotary pinion adapted to engage one of said rows on the up stroke and to engage the other row on the down stroke of said member, two rotary clutch members adapted to engage said pinion, one of said members serving to drive said pinion on the up stroke, and the other clutch member serving to hold the pinion from being rotated on the down stroke by the weight of said load lifting member, the last named clutch member being movable into and out of engagement with said pinion, and adjustable yielding means for normally forcing said blades toward the into-the-wind position.

16. In a windmill, a wind wheel having blades movable by excess wind pressure from the into-the-wind position, a vertically movable load lifting member having two longitudinal rows of rack teeth, a rotary shaft, means for driving said shaft from said windwheel, a pinion rotatable on said shaft and adapted to engage one of said rows on the up stroke and the other row on the downstroke of said load lifting member, two clutch members rotatable with said shaft, one clutch member serving to drive the pinion and to permit it to rotate faster than the shaft, the other clutch member serving to hold the pinion from rotating faster than the shaft, the last named clutch member being releasable from the pinion, and adjustable yielding means for forcing said blades toward the into-the-wind position.

17. In a windmill, a wind wheel having blades movable by excess wind pressure from the into-the-wind position, a vertically movable load lifting member having two longitudinal rows of rack teeth, a rotary shaft, means for driving said shaft from said wind wheel, a pinion rotatable on said shaft and adapted to engage said rows alternately, two clutch members rotatable with said shaft one serving to drive said pinion and to permit it to rotate faster than the shaft, the other serving to hold the pinion from rotating faster than said shaft, the last named clutch member being releasable from said pinion, a lever, adjustable means for swinging said lever, and means actuated by said lever for forcing said blades toward the into-the-wind position.

18. In a windmill, a rotary wind wheel, a vertically movable load lifting member, means actuated by said windwheel for lifting said member and adapted to permit said member to fall by gravity on the down stroke, and releasable means by which the movement of said member in both directions is effected by said actuating means.

In testimony whereof I have signed my name to this specification.

ALBERT F. GEORGE.

Copies of this patent may be obtained for five cents each, by addressing the "Commissioner of Patents, Washington, D. C."